US010472203B2

(12) United States Patent
Kattainen et al.

(10) Patent No.: US 10,472,203 B2
(45) Date of Patent: Nov. 12, 2019

(54) METHOD AND APPARATUS FOR AUTOMATIC DETERMINATION OF ELEVATOR DRIVE CONFIGURATION

(71) Applicants: Ari Kattainen, Hyvinkaa (FI); Jyrki Laaksonheimo, Hyvinkaa (FI)

(72) Inventors: Ari Kattainen, Hyvinkaa (FI); Jyrki Laaksonheimo, Hyvinkaa (FI)

(73) Assignee: Kone Corporation, Helsinki (FI)

( * ) Notice: Subject to any disclaimer, the term of this patent is extended or adjusted under 35 U.S.C. 154(b) by 315 days.

(21) Appl. No.: 15/274,149

(22) Filed: Sep. 23, 2016

(65) Prior Publication Data
US 2017/0008730 A1 Jan. 12, 2017

Related U.S. Application Data (63) Continuation of application No. PCT/FI2015/050204, filed on Mar. 25, 2015.

(30) Foreign Application Priority Data

Mar. 26, 2014 (EP) .................................... 14161770

(51) Int. Cl.
*B66B 7/12* (2006.01)
*B66B 1/30* (2006.01)
(Continued)

(52) U.S. Cl.
CPC ............ *B66B 1/304* (2013.01); *B66B 1/3476* (2013.01); *H02P 23/0004* (2013.01)

(58) Field of Classification Search
USPC ........................................................ 187/293
See application file for complete search history.

(56) References Cited

U.S. PATENT DOCUMENTS 3,638,185 A * 1/1972 Dell .................... G05D 3/14
 347/247
4,793,442 A * 12/1988 Heckler .................... B66B 1/28
 187/292
(Continued)

FOREIGN PATENT DOCUMENTS

EP 0936730 A2 8/1999
EP 1792865 A1 6/2007
(Continued)

OTHER PUBLICATIONS

International Search Report PCT/ISA/210 for International Application No. PCT/FI2015/050204 dated Jun. 16, 2015.
(Continued)

*Primary Examiner* — Christopher Uhlir
(74) *Attorney, Agent, or Firm* — Harness, Dickey & Pierce, P.L.C.

(57) ABSTRACT

The invention relates to a method and an apparatus the invention is a method for automatic configuration of an elevator drive in a traction elevator comprising an elevator car, a counterweight, a traction sheave, an electrical motor and a plurality of elevator ropes arranged to hoist the elevator car in response to the electrical motor rotating the traction sheave. The method comprises obtaining a plurality of electrical motor parameters from a memory associated with the electrical motor. A drive computer unit determines a roping ratio of the elevator by driving the elevator a distance based on elevator position sensor information and determines a plurality of torque values required to hoist the elevator with a predefined starting acceleration when the elevator car is loaded with a respective plurality of different loads. The torque values per each load are stored to a memory of the drive computer unit.

20 Claims, 6 Drawing Sheets

(51) Int. Cl.
    *H02P 23/00*     (2016.01)
    *B66B 1/34*     (2006.01)

(56) References Cited

U.S. PATENT DOCUMENTS

| | | | |
|---|---|---|---|
| 5,929,400 | A | 7/1999 | Colby et al. |
| 6,325,179 | B1 * | 12/2001 | Barreiro ............... B66B 5/0037 |
| | | | 187/393 |
| 7,344,003 | B2 | 3/2008 | Kimura et al. |
| 7,637,357 | B2 | 12/2009 | Nakagawa et al. |
| 7,806,237 | B2 * | 10/2010 | Aulanko ............... B66B 11/08 |
| | | | 187/264 |
| 2005/0217945 | A1 | 10/2005 | Kimura et al. |
| 2007/0227826 | A1 | 10/2007 | Nakagawa et al. |
| 2009/0026021 | A1 | 1/2009 | Kimura et al. |
| 2013/0106335 | A1 | 5/2013 | Uusi-Aijo |

FOREIGN PATENT DOCUMENTS

| | | |
|---|---|---|
| EP | 2590317 A1 | 5/2013 |
| WO | WO-0114237 A1 | 3/2001 |
| WO | WO-2004058617 A1 | 7/2004 |

OTHER PUBLICATIONS

Extended European Search Report for European Patent Application No. 14161770.4, dated Nov. 5, 2014.

\* cited by examiner

FIG. 6 methods and apparatus for automatic determination of elevator drive configuration

METHOD AND APPARATUS FOR AUTOMATIC DETERMINATION OF ELEVATOR DRIVE CONFIGURATION

This application is a continuation of PCT International Application No. PCT/FI2015/050204 which has an International filing date of Mar. 25, 2015, the entire contents of which are incorporated herein by reference.

BACKGROUND OF THE INVENTION

Field of the Invention

The invention relates to elevators, elevator installation and a method and an apparatus for automatic elevator drive configuration.

Description of the Related Art

An important part of elevator installation is the configuration of the elevator drive. The elevator drive controls power supply to an electrical motor and brakes of the elevator and thus affects the lifting regarding, for example, acceleration, deceleration, speed and height lifted or lowered.

The elevator drive must be configured appropriately following installation of elevator roping, counterweight and elevator car in an elevator shaft to ensure safe, comfortable and correct operation of the elevator. The configuration of the elevator drive comprises specifying a number of parameters to be stored in a memory associated with the elevator drive. Some of the parameters are associated with properties of the elevator electrical motor such as nominal torque, nominal current, source voltage, input frequency and acceleration current, whereas some of the parameters are associated with the elevator generally such as roping ratio and weights of the elevator car and the counterweight. Among the parameters associated with the motor are also parameters related to integral parts of the motor such as traction sheave and brakes. Regarding the traction sheave it is important to know the diameter of the traction sheave so that supplying frequency of the motor and torque to be applied to the ropes by the motor may be determined. Regarding the brakes it is important to know the current and voltage to be supplied to the brakes to keep the brakes open and the time it takes to apply the brakes.

In prior art the configuration of elevator drive has been performed using a user interface that is communicatively connected to an elevator drive unit. The user interface allows the manual entry of each separate parameter. The parameters may be superficially checked for range errors while entry by the user interface, but there is no actual automatic checking regarding the elevator machinery actually installed. The parameters to be entered are read by the person performing the installation from such sources as the nameplate of the electrical motor.

The configuring of the elevator drive is a process that requires precision and takes time. Configuration errors may cause damage to the elevator when the elevator is tested following the configuration. Configuration may take, for example, one whole day for a person performing the installation.

Therefore, it would be beneficial if elevator drive parameters could be automatically determined so that a need for manual parameter entry would be eliminated.

SUMMARY OF THE INVENTION

According to an aspect of the invention, the invention is a method for automatic configuration of an elevator drive in a traction elevator comprising an elevator car, a counterweight, a traction sheave, an electrical motor and a plurality of elevator ropes arranged to hoist the elevator car in response to the electrical motor rotating the traction sheave, the method comprising: obtaining, by a drive computer unit of the elevator, a plurality of electrical motor parameters via a communication channel from a memory associated with the electrical motor; transmitting, by the drive computer unit, a first signal causing the electrical motor to rotate the traction sheave a predefined distance, following the obtaining of the plurality of the electrical motor parameters; receiving, by the drive computer unit, a first measurement signal indicating a distance travelled by the elevator car in response to the rotating of the traction sheave the predefined distance, the first response signal being received from at least one of an accelerometer of the elevator car and a position sensor of the elevator car; determining, by the drive computer unit, a roping ratio of the elevator by comparing the distance travelled to the predefined distance; reading, by the drive computer unit, a plurality of weights from a load weighing device communicatively connected to the drive computer unit during a plurality of respective tests, the elevator car being loaded during the plurality of tests with a plurality of respective test weights, the test weights being different, the reading being performed following the determining of the roping ratio, the plurality of weights comprising at least one of a weight of the elevator car and weight of a load in the elevator car; determining, by the drive computer unit, a plurality of respective torque values for the plurality of respective weights read during the plurality of tests, the plurality of torque values being required to be applied by the electrical motor in order to lift the elevator car with a predefined starting acceleration, the determination being performed based on a plurality of second measurement signals received from at least one of an accelerometer of the elevator car and a position sensor of the elevator car, the plurality of second measurement signals indicating an actual acceleration of the elevator car; and recording to a memory of the drive computer unit, the plurality of respective torque values determined for the plurality of weights read, the plurality of torque values being associated in the memory with the plurality of respective weights.

According to a further aspect of the invention, the invention is a method for manufacturing and installing a motor of a traction elevator, the method comprising: determining a plurality of parameters of an electrical motor during a testing of the electrical motor, the plurality of parameters comprising at least one of a serial number, a nominal torque, a nominal current, a resistance, a reactance, a source voltage, a voltage, an acceleration current, an input frequency, a nominal input frequency, a nominal angular velocity, a torque graph, a traction sheave diameter, a traction sheave radius, a number of magnetic dipoles, a brake voltage, a brake current, a brake current decay time, a brake current half-life, an encoder type, a number of pulses of the encoder and a gear ratio of the electrical motor; storing the plurality of parameters of the electrical motor determined to a memory; installing the memory to the electrical motor; installing the electrical motor in the traction elevator, following the installing of the memory to the electrical motor; connecting a communication channel between a drive computer unit and the memory comprising the plurality of electrical motor parameters, following the installing of the electrical motor; powering on the elevator and the drive computer unit; and determining a plurality of elevator parameters required in driving the elevator correctly by the drive computer unit, the plurality of elevator parameters being determined using the plurality of parameters of an electrical motor, in response to the powering on of the elevator and the drive computer unit.

According to a further aspect of the invention, the invention is an apparatus comprising a processor, and a memory storing instructions that, when executed, cause the elevator apparatus to obtain a plurality of electrical motor parameters via a communication channel from a memory associated with an electrical motor, to transmit a first signal causing the electrical motor to rotate a traction sheave of an elevator a predefined distance, following the obtaining of the plurality of the electrical motor parameters, to receive a first measurement signal indicating a distance travelled by a car of an elevator in response to the rotating of the traction sheave the predefined distance, the first response signal being received from at least one of an accelerometer of the elevator car and a position sensor of the elevator car, to determine a roping ratio of the elevator by comparing the distance travelled to the predefined distance, to read a plurality of weights of the elevator car from a load weighing device communicatively connected to the drive computer unit during a plurality of respective tests, the elevator car being loaded during the plurality of tests with a plurality of respective test weights, the test weights being different, the reading being performed following the determining of the roping ratio, to determine a plurality of respective torque values for the plurality of respective elevator car weights read during the plurality of tests, the plurality of torque values being required to be applied by the electrical motor in order to lift the elevator car with a predefined starting acceleration, the determination being performed based on a plurality of second measurement signals received from at least one of an accelerometer of the elevator car and a position sensor of the elevator car, and to record to a memory of the drive computer unit, the plurality of torque values determined for the plurality of elevator car weights read, the plurality of torque values being associated in the memory with the plurality of elevator car weights.

According to a further aspect of the invention, the invention is an apparatus, the apparatus comprising: means for obtaining a plurality of electrical motor parameters via a communication channel from a memory associated with the electrical motor; means for transmitting a first signal causing the electrical motor to rotate a traction sheave of an elevator a predefined distance, following the obtaining of the plurality of the electrical motor parameters; means for receiving a first measurement signal indicating a distance travelled by the elevator car in response to the rotating of the traction sheave the predefined distance, the first response signal being received from at least one of an accelerometer of the elevator car and a position sensor of the elevator car; means for determining a roping ratio of the elevator by comparing the distance travelled to the predefined distance; means for reading a plurality of weights from a load weighing device communicatively connected to the drive computer unit during a plurality of respective tests, the elevator car being loaded during the plurality of tests with a plurality of respective test weights, the test weights being different, the reading being performed following the determining of the roping ratio, the plurality of weights comprising at least one of a weight of the elevator car and weight of a load in the elevator car; means for determining a plurality of respective torque values for the plurality of respective weights read during the plurality of tests, the plurality of torque values being required to be applied by the electrical motor in order to lift the elevator car with a predefined starting acceleration, the determination being performed based on a plurality of second measurement signals received from at least one of an accelerometer of the elevator car and a position sensor of the elevator car, the plurality of second measurement signals indicating an actual acceleration of the elevator car; and means for recording to a memory of a drive computer unit, the plurality of respective torque values determined for the plurality of weights read, the plurality of torque values being associated in the memory with the plurality of respective weights.

According to a further aspect of the invention, the invention is a computer program comprising code adapted to cause the following when executed on a data-processing system: obtaining, by a drive computer unit of the elevator, a plurality of electrical motor parameters via a communication channel from a memory associated with an electrical motor; transmitting, by the drive computer unit, a first signal causing the electrical motor to rotate a traction sheave of an elevator a predefined distance, following the obtaining of the plurality of the electrical motor parameters; receiving, by the drive computer unit, a first measurement signal indicating a distance travelled by an elevator car in response to the rotating of a traction sheave the predefined distance, the first response signal being received from at least one of an accelerometer of the elevator car and a position sensor of the elevator car; determining, by the drive computer unit, a roping ratio of the elevator by comparing the distance travelled to the predefined distance; reading, by the drive computer unit, a plurality of weights from a load weighing device communicatively connected to the drive computer unit during a plurality of respective tests, the elevator car being loaded during the plurality of tests with a plurality of respective test weights, the test weights being different, the reading being performed following the determining of the roping ratio, the plurality of weights comprising at least one of a weight of the elevator car and weight of a load in the elevator car; determining, by the drive computer unit, a plurality of respective torque values for the plurality of respective weights read during the plurality of tests, the plurality of torque values being required to be applied by the electrical motor in order to lift the elevator car with a predefined starting acceleration, the determination being performed based on a plurality of second measurement signals received from at least one of an accelerometer of the elevator car and a position sensor of the elevator car, the plurality of second measurement signals indicating an actual acceleration of the elevator car; and recording to a memory of the drive computer unit, the plurality of respective torque values determined for the plurality of weights read, the plurality of torque values being associated in the memory with the plurality of respective weights.

According to a further aspect of the invention, the invention is method and an apparatus for automatic configuration of an elevator drive in a traction elevator comprising an elevator car, a counterweight, a traction sheave, an electrical motor and a plurality of elevator ropes arranged to hoist the elevator car in response to the electrical motor rotating the traction sheave. The method comprises obtaining, by a drive computer unit, a plurality of electrical motor parameters from a memory associated with the electrical motor over a communication channel connecting the memory to the drive computer unit; determining, by the drive computer unit, a roping ratio of the elevator by driving the elevator traction sheave a distance using the electrical motor, which distance is compared to an actual distance of a travel of the elevator car, the actual distance of travel being provided by at least one of an elevator car position sensor and acceleration sensor of the elevator car; determining, by the drive computer unit, a plurality of torque values required to hoist the elevator with a predefined starting acceleration when the elevator car is loaded with a respective plurality of different loads; storing, by the drive computer unit, the plurality of torque values in association with respective plurality of different load to a memory of the drive computer unit.

In one embodiment of the invention, the method further comprises determining, by the drive computer unit, a rotation direction of the electrical motor by comparing the distance travelled to the predefined distance.

In one embodiment of the invention, the step of determining the plurality of respective torque values for the plurality of respective weights read comprises: estimating, by the drive computer unit, a plurality of respective estimated torques corresponding to the plurality of weights read during the plurality of tests; initiating, by the drive computer unit, applying of the plurality of estimated torques using the electrical motor during the plurality of tests; determining, by the drive computer unit, based on a plurality of third measurement signals a plurality of respective differences in relation to the predefined starting acceleration during the plurality of tests, the plurality of third measurement signals being received from at least one of an accelerometer of the elevator car and a position sensor of the elevator car during the plurality of tests, the plurality of third measurement signals being among the plurality of second measurement signals; initiating, by the drive computer unit, applying of a plurality of respective adjusted torques using the electrical motor during the plurality of tests, the plurality of adjusted torques being formed based on the plurality of differences; and repeating the step of determining based on the plurality of third measurement signals the plurality of respective differences from the predefined starting acceleration during the plurality of tests and the step of initiating the applying of the plurality of respective adjusted torques until the plurality of respective differences are below a predefined threshold value.

In one embodiment of the invention, method further comprises transmitting, by the drive computer unit, a second signal causing the electrical motor to lift or lower the elevator car to a test floor; reading, by the drive computer unit, a plurality of weights of the elevator car during a plurality of respective test occasions from a load weighing device communicatively connected to the drive computer unit, the elevator car being loaded during the plurality of respective test occasions with a plurality of respective test weights, the test weights being different, the elevator car being in the test floor; determining, by the drive computer unit, a plurality of respective torque values for the plurality of respective weights read while the elevator car is in the test floor, the plurality of respective torque values being required to be applied by the electrical motor in order to lift the elevator car with a predefined starting acceleration, the determination being performed based on a plurality of second response signals received from at least one of an accelerometer of the elevator car and a position sensor of the elevator car; and recording to the memory of the drive computer unit, an association between an identifier of the test floor and the torque values determined for the plurality of weights read.

In one embodiment of the invention, the method further comprises determining the elapsing of a predefined time from the recording to the memory of the drive computer unit the plurality of torque values determined for the plurality of weights read; reading, by the drive computer unit, a weight of the elevator car from a load weighing device communicatively connected to the drive computer unit; determining, by the drive computer unit, a torque values for the weight read, the torque values being required to be applied by the electrical motor in order to lift the elevator car with a predefined starting acceleration, the determination being performed based on a fourth measurement signals received from at least one of an accelerometer of the elevator car and a position sensor of the elevator car; and recording to a memory of the drive computer unit, the torque value determined for the weight read, the torque value being associated in the memory with the weight.

In one embodiment of the invention, the elevator car is loaded with a test weight.

In one embodiment of the invention, the elevator car is loaded with a plurality of passengers, the elevator being in normal passenger use.

In one embodiment of the invention, the memory associated with the electrical motor is communicatively connected to the drive computer unit via an encoder of the electrical motor and the drive computer unit obtains the plurality of electrical motor parameters via the encoder.

In one embodiment of the invention, the communication channel is also used to transmit rotor position signals from an encoder of the electrical motor.

In one embodiment of the invention, the memory is connected to the drive computer unit via thermistor leads of the electrical motor.

In one embodiment of the invention, the method further comprises using an electrical motor overload relay to cut power supply to the electrical motor in case of overload.

In one embodiment of the invention, the method further comprises: measuring a resistance of at least one coil in the electrical motor; and cutting power supply to the electrical motor in case the resistance exceeds a predefined threshold value.

In one embodiment of the invention, the plurality of electrical motor parameters obtained from the memory associated with the electrical motor comprise also an error detecting code allowing the drive computer unit to check a correctness of the plurality of electrical motor parameters in case of a possible data transmission error or in case of a possible memory failure.

In one embodiment of the invention, the load weighing device is a strain gauge affixed to a surface of a mounting device to which the plurality of traction ropes are secured, the surface experiencing strain proportional to a load of the elevator car.

In one embodiment of the invention, the method further comprises: reading, by the drive computer unit, a load weight from the load weighing device when the elevator is in use; interpolating a torque value corresponding to the load weight based on at least two weights retrieved from the memory of the drive computer unit, the torque value being required for the predefined starting acceleration; and applying the torque value interpolated by the electrical motor to lift the elevator car.

According to a further aspect of the invention, the invention is an elevator comprising the apparatus.

According to a further aspect of the invention, the invention is a computer program product comprising the computer program.

In one embodiment of the invention, an elevator rope shackle comprises securing means, for example, a gyve, to which an elevator rope may be attached or secured. The securing means is connected using a spring to a point of attachment in a supporting structure in elevator shaft. The spring may have inside it a threaded shaft which allows controlling of spring maximum length.

In one embodiment of the invention, the drive computer unit is a drive control unit.

In one embodiment of the invention, a drive control unit is the drive computer unit.

In one embodiment of the invention, the elevator car may also be referred to as elevator cage. The elevator car may be elevator cage.

In one embodiment of the invention, the computer program is stored on a non-transitory computer readable medium. The computer readable medium may be, but is not limited to, a removable memory card, a removable memory module, a magnetic disk, an optical disk, a holographic memory or a magnetic tape. A removable memory module may be, for example, a USB memory stick, a PCMCIA card or a smart memory card.

In one embodiment of the invention, an apparatus comprising at least one processor and at least one memory including computer program code, the at least one memory and the computer program code are configured to, with the at least one processor, cause the apparatus at least to perform a method according to any of the method steps.

In one embodiment of the invention, the at least one processor of the apparatus, for example, of the drive computer unit may be configured to perform any of the method steps disclosed hereinabove.

In one embodiment of the invention, an elevator drive control unit comprising at least one processor and a memory may be configured to perform any of the method steps disclosed hereinbefore.

The embodiments of the invention described herein may be used in any combination with each other. Several or at least two of the embodiments may be combined together to form a further embodiment of the invention. A method, an apparatus, a computer program or a computer program product to which the invention is related may comprise at least one of the embodiments of the invention described hereinbefore.

It is to be understood that any of the above embodiments or modifications can be applied singly or in combination to the respective aspects to which they refer, unless they are explicitly stated as excluding alternatives.

The benefits of the invention are related to easier, faster and more error proof elevator drive configuration and installation.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
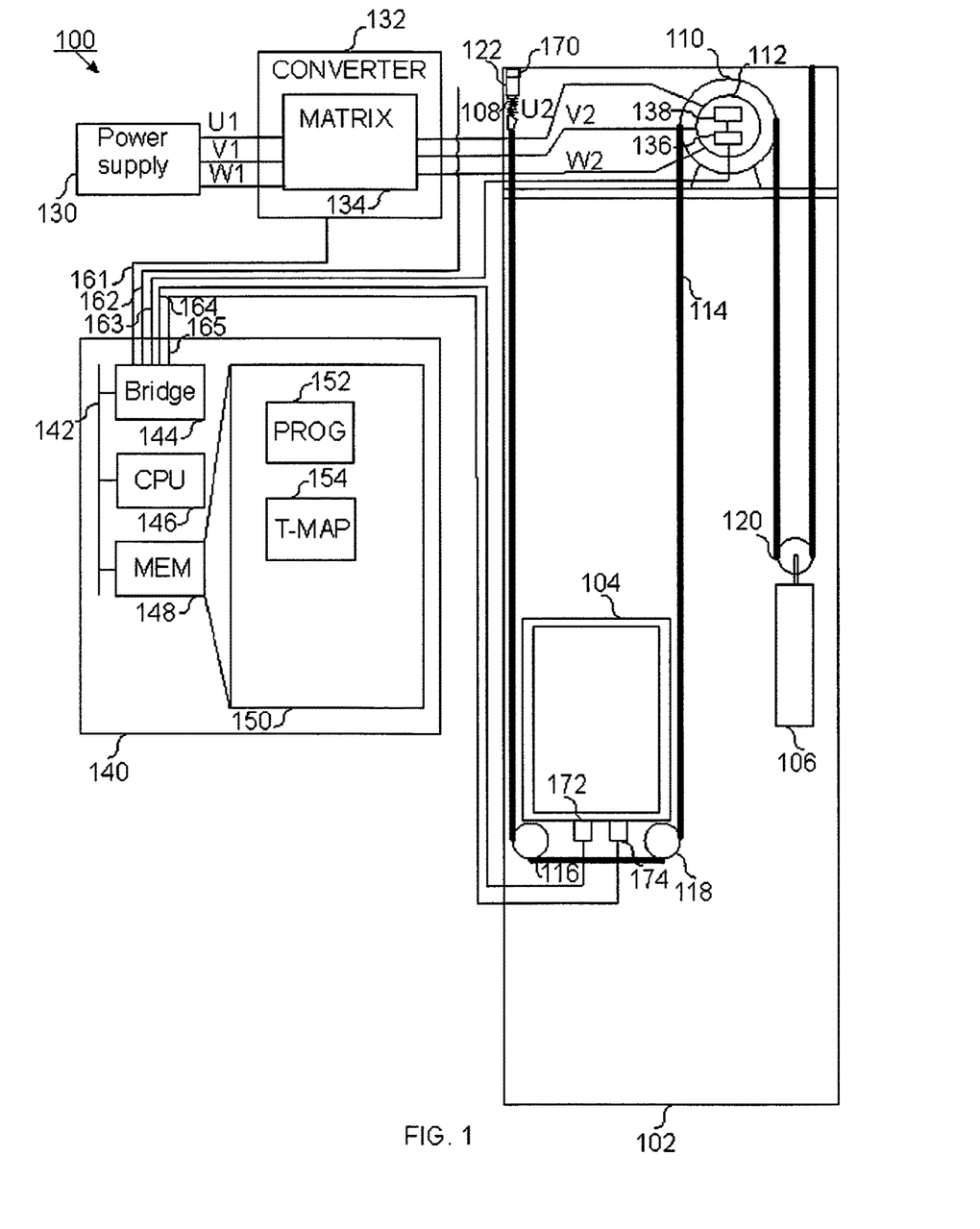
FIG. 1 illustrates an elevator comprising a drive computer unit which performs an automatic self-configuration procedure when powered on in one embodiment of the invention.

FIG. 1 illustrates an elevator comprising a drive computer unit which performs an automatic self-configuration procedure when powered on in one embodiment of the invention.

In FIG. 1 there is illustrated an elevator 100. Elevator 100 has an elevator shaft 102 in which an elevator car 104 is hoisted or lowered using an electrical motor 112 rotating a traction sheave 110. Elevator car 104 is hoisted or lowered using traction sheave 110 over which a plurality of traction ropes (or belt) 114 that support elevator car 104 and a counterweight 106 are looped. Elevator car 104 is supported on the plurality of traction ropes 114 in FIG. 1 with two diverting pulleys underneath elevator car 104. Counterweight 106 is hung from the plurality of traction ropes 114 with a diverting pulley 120. In place of traction ropes 114 other traction means such as a traction belt may be used. Elevator car 104 and counterweight 106 may also be directly secured to the plurality of traction ropes 114. Traction ropes 114 may be secured to a supporting structure of elevator shaft 102 using a mounting device 122. The supporting structure (not shown) may be a supporting wall of elevator shaft 102 or a supporting beam in elevator shaft 102. To mounting device 122 may be mounted a separate elevator shackle for each traction rope among the plurality of traction ropes 114 such as elevator shackle 108. Elevator shackles enable traction ropes to be precisely adjusted to have a uniform tension so that traction ropes are not required to have a uniform length that is maintained even after each individual rope is secured to mounting device 122 with loops. Elevator shaft also comprises guide rails (not shown) which enable elevator car 104 to be hoisted or lowered in vertical direction in a controlled horizontal position with respect to walls in elevator shaft 102 and landing doors in elevator shaft 102. There are similar guide rails (not shown) which enable counterweight 106 to be hoisted or lowered in vertical direction in a controlled horizontal position. Due to the guide rails, elevator car 104 or counterweight 106 do not bounce towards walls in elevator shaft 102. Elevator car 104 is suspended on the plurality of parallel traction ropes 114 looped over traction sheave 110, which has a respective plurality of parallel grooves for the plurality of traction ropes 114. In FIG. 1 the plurality of traction ropes 114 are secured to elevator shackles such as elevator shackle 108 which in turn are secured to mounting device 122. In FIG. 1 the plurality of traction ropes 114 are led to pass under elevator car 104 around a first diverting pulley 116 and a second diverting pulley 118. The plurality of traction ropes are led to pass from second diverting pulley 118 to a first side of traction sheave 110 and from there over traction sheave 110 to a second side of traction sheave 110. From the second side of traction sheave 110 the plurality of traction ropes 114 are led to pass under diverting pulley 120 connected to counterweight 106. The traction ropes 114 passed under diverting pulley 120 may be secured to an upper portion of elevator shaft 102 such as the roof of elevator shaft 102 in FIG. 1. Associated with mounting device 122 there is a load weighing device 170, which is configured to measure weight of elevator car 104 and by knowing the weight of elevator car 104 a current load in elevator car 104. Load weighing device 170 may also be located in traction sheave 110 or in elevator car 104 for the purposes of the method described herein. Elevator car 104 comprises an accelerometer 174 and a position sensor 172. Position sensor 172 determines a vertical position of elevator car 104 in elevator shaft. Position sensor 172 may be implemented with a plurality of Hall-sensors which sense a position of sensor 172 in relation to an array of permanent magnets (not shown) in a wall of elevator shaft 102. The array of permanent magnets faces the position sensor 172.

Elevator 100 has electrical motor 112. Electrical motor 112 comprises a rotor and a stator (not shown). Electrical motor comprises an encoder 136 which outputs a signal indicating a position of the rotor in relation to the stator. The signal may be, for example, an analog voltage signal or a digital message based signal. In FIG. 1 in association with encoder 136 there is an electronic nameplate, that is, a memory 138 which is communicatively connected to encoder 136, for example, via a message bus. Encoder 136 is configured to transmit a signal indicating a plurality of parameters describing motor 112 for use by an elevator drive unit 140.

In FIG. 1 there is illustrated a power supply 130 which supplies a three-phase electrical current to a matrix 134 in a frequency converter 132. To matrix 134 are connected three-phase electrical lines U1, V1 and W1 of power supply 130 which is an AC power supply. In place of matrix 134 there may be a rectifier and an inverter (not shown)(— comment: matrix converter is actually not very common, rectifier+inverter is the preferred embodiment—). The rectifier supplies a direct current to an inverter which outputs pulse-width modulated signals via three-phase electrical lines U2, V2 and W2 connected to electrical motor 112. Converter 132 is controlled by elevator control unit 140 via communication channel 161. (comment: since 140 refers to a processor control board a control unit might be more suitable term; drive unit normally refers to combination of motor and frequency converter or to hoisting machine as such) Elevator control unit 140 provides instructions to converter 132 which request a specific torque to be applied to traction sheave 110 using electrical motor 112. The specific torque is achieved by converter 132 by controlling matrix 134. Matrix 134 is controlled to output pulse-width modulated signals via three-phase electrical lines U2, V2 and W2 with a duty cycle that corresponds to the specific torque. Duty-cycle represents the percentage of time that the pulse-width modulated pulses are on. The pulses supplied via the three-phase electrical lines U2, V2 and W2 create rotating magnetic fields in stator windings of electrical motor 112. The magnetic fields cause the rotor in electrical motor 112 to rotate thereby causing the specific torque in the plurality of traction ropes 114 over traction sheave 110.

Elevator control unit 140 is a computer unit which comprises an internal message bus 142, to which is connected at least one processor 146 and a memory 148, which may be a Random-Access Memory (RAM). Elevator drive unit 140 may also be referred to as drive computer unit 140 or elevator drive control computer unit 140. To internal message bus 142 is also connected a bus bridge 144, which is configured to receive signals from a plurality of external sensors. In FIG. 1 to bridge 144 are connected communication channels 161, 162, 163, 164 and 165. Communication channel 161 is used by elevator drive unit 140 to provide instructions to converter 132 regarding a torque to be applied using electrical motor 112 to traction sheave 110. Communication channel 162 is used by bridge 144 to receive signals from load weighing device 170, which may indicate a voltage output by a strain gauge (not shown) in mounting device 122. The strain gauge translates a strain into a voltage. The strain is induced by current weight of elevator car 104 to a member in mounting device 122. The strain gauge is placed on the mounting device 122 to the member which reacts to the strain due to the current weight of elevator car 104. Communication channel 163 is used by elevator drive unit 140 to receive via bridge 144 signals from encoder 136 in motor 112. The signals indicate relative positions of the stator and rotor in electrical motor 112. Communication channel 165 is used by elevator drive unit 140 to receive via bridge 144 signals from elevator car accelerometer 174. Communication channel 164 is used by elevator drive unit 140 to receive via bridge 144 signals from elevator car position sensor 172.

In FIG. 1 there is illustrated a box 150 which illustrates the contents of memory 148. To memory 148 is stored a computer program 152 for automatic elevator drive configuration. To memory 148 is stored also a data structure 154 providing a mapping between load weighing device readings and torque values required to lift elevator car 104. The torque values are selected to enable a smooth start in lifting elevator car 104 without falling or a rapid jerk. Processor 146 is configured to receive load weighing device readings via bridge 144 from communication channel 162 and store the readings to data structure 154 in memory 148. The load weighing device readings may be expressed in Volts (V).

In one embodiment of the invention data structure 154 is a list in which each list item stores a load weighing device reading, for example, in Volts and a corresponding torque value, for example, in Newton meters (Nm). The stored a torque value that has been determined to cause a smooth starting acceleration for elevator car 104 when the torque value is applied using electrical motor 112. When elevator 100 is in passenger use, all precise load weighing device readings may not be directly available in the list. Therefore, starting from a precise load weighing device reading for which there is not list item, the list is checked, by processor 146, to find a first list item in the list where a first load weighing device reading stored is larger than the precise load weighing device reading. Thereupon, a preceding second list item is obtained, by processor 146, which has a second load weighing device reading that is smaller than the precise load weighing device reading. Thereupon, a first torque value in the first list item and a second torque value in the second list item are obtained by processor 146, which estimates a precise torque value for the precise load weighing device reading based on the first torque value, the second torque value, the first load weighing device reading and the second load weighing device reading. The estimation may apply linear interpolation. Processor 146 may also instead perform polynomial interpolation or spline interpolation using a plurality of load weighing device readings in the list and their corresponding torque values in the list to obtain an estimated torque value for the precise load weighing device reading.

In one embodiment of the invention, in data structure 154 there is a separate list for each floor in elevator shaft 102. A list among the separate list is selected, by processor 146, first using a current floor number of elevator car 104 in which elevator car 104 is parked. Thereupon, a specific torque value is obtained, by processor 146, for a precise load weighing device reading as in the case of a single list. In case there is no list for a specific floor a list for a nearest floor may be selected by processor 146.

The starting point in FIG. 1 is that before installation of electrical motor 112 a plurality of parameters of electrical motor 112 are determined during a factory testing of electrical motor 112 or based on a model of electrical motor 112. The parameters of model may have also been determined using factory testing as well as in the planning stage. Certain parameters are specific for a motor manufactured while certain parameters do not vary between individual specimens manufactured of a specific model. The plurality of parameters comprising, for example, at least one of a serial number, a nominal torque, a nominal current, a resistance, a reactance, a source voltage, a voltage, an acceleration current, an input frequency, a nominal input frequency, a nominal angular velocity, a torque graph, a traction sheave diameter, a traction sheave radius, a number of magnetic dipoles, a brake voltage, a brake current, a brake current decay time, a brake current half-life, an encoder type, a number of pulses of the encoder and a gear ratio of the electrical motor. The plurality of parameters is stored to memory 138. Memory 138 may be installed in electrical motor 112 during manufacturing or afterwards. During installation electrical motor 112 is installed to elevator shaft 102. Similarly, elevator car 104, counterweight 106 and the plurality of traction ropes 114 are installed in elevator 100.

During installation converter 132 is installed in elevator 100 in a service cabined of elevator 100 and electrical output lines from converter 132 are connected to electrical motor 112. Electrical input lines to converter 132 are connected to power supply 130 (e.g. mains). During elevator installation, memory 138 may be connected to electrical motor 112. Further, during installation drive control unit 140 is connected to converter 132 to enable a communication channel to be established between converter 132 and drive control unit 140.

Thereupon, when elevator 100 is powered on, processor 143 in drive control unit 140 executes at least part of program 152 to perform automatic configuration of elevator drive. By elevator drive may be meant drive control unit 140 and converter 132. The configuration comprises the determination of a plurality of elevator 100 specific parameters that are stored in memory 148. The parameters comprise a roping ratio of elevator 100 and a mapping of load weighing device readings to torque values so that a smooth starting acceleration is achieved for different loads of elevator car 104.

The starting point for the determination of the elevator specific parameters is that drive control unit 140 obtains a plurality of electrical motor parameters via a communication channel from memory 138 associate with the electrical motor 112. Thereupon, drive control unit 140 transmits a first signal over communication channel 161 causing electrical motor 112 to rotate traction wheel 110 a predefined distance. Thereupon, drive control unit 140 receives a first measurement signal indicating a distance travelled by elevator car 104 in response to a rotating of electrical motor 112 the predefined distance, which may be also expressed as, a number of revolutions of traction sheave 110. The first response signal is received from accelerometer 174 or elevator car 104 or position sensor 172 of elevator car 104. Thereupon, drive control unit 140 determines a roping ratio of elevator 100 by comparing the distance travelled to the predefined distance. Thereupon, drive control unit 140 executes a plurality of weight tests to determine a plurality of respective torque values for electrical motor 112 which achieve a smooth starting of elevator car 104 for a respective plurality of elevator car 104 test weights.

During each weight test drive control unit 140 reads a weight reading from load weighing device 170 communicatively connected to drive control unit 140. The reading corresponds to and is indicative of a current weight of elevator car 104. The current weight is due to an empty weight of elevator car 104 and a test weight placed in elevator car 104. To the current weight may also contribute a weight of a part of the plurality of traction ropes 114, the part depends on the current position of elevator car 104. In FIG. 1 the part of the plurality of traction ropes 114 would be the part extending from mounting device 122 to traction sheave 110. Recall that in one embodiment of the invention, the floor in which a weight test is performed is stored in data structure 154. Each weight test may be performed from a specific vertical position of elevator car 104 in elevator shaft 102, for example, corresponding to a position where elevator car 104 doors and landing doors of a floor are in alignment. Drive control unit 140 determines a torque value required to be applied by electrical motor 112 in order to lift elevator car 104 via traction sheave 110 and the plurality of ropes 114 with a predefined starting acceleration that corresponds to a smooth starting. The determination is performed by drive control unit 140 based on a plurality of second measurement signals received from rotor movement sensor, such as rotor encoder and/or (comment: starting sway is preferable measured directly from rotor/traction sheave and not from car because of spring effect in the ropes between tractions sheave and car) accelerometer 174 or position sensor 172 of elevator car 104. Drive control unit 140 may try an increasing sequence of torque values starting from an initial estimated torque value until accelerometer 174 or position sensor 172 indicate an acceleration that represents a smooth starting acceleration. Following each trying, elevator car 104 may be returned to the original position. Drive control unit records to memory 148 in a list item the weight reading from load weighing device 170 and the torque value determined, when the torque value has been determined by drive control unit 140. A list for the list item may be selected based on the floor in which the determination of the torque value was performed. In data structure 154 there may be multiple lists, one for each floor. In one embodiment of the invention, the weight tests may be performed for a plurality of different floor, for example, for each floor. The weight reading is the one determined before lifting elevator car 104 during the torque determination.

The embodiments of the invention described hereinbefore in association with the summary of the invention and FIG. 1 may be used in any combination with each other. At least two of the embodiments may be combined together to form a further embodiment of the invention.

Figure 2A:
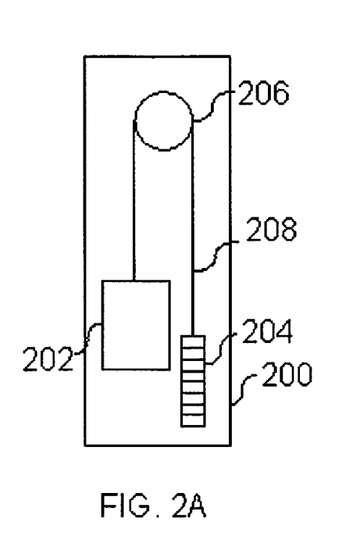
FIG. 2A illustrates elevator roping arrangements having 1:1 roping ratio in one embodiment of the invention.

FIG. 2A illustrates elevator roping arrangements having 1:1 roping ratio in one embodiment of the invention.

In FIG. 2A there is an elevator 200. Elevator 200 has elevator car 202, counterweight 204, traction sheave 206 and traction means 208. The traction means may be elevator ropes or a traction belt.

The elevator drive configuration method explained in association with FIG. 1 may be used in elevator 200.

Figure 2B:
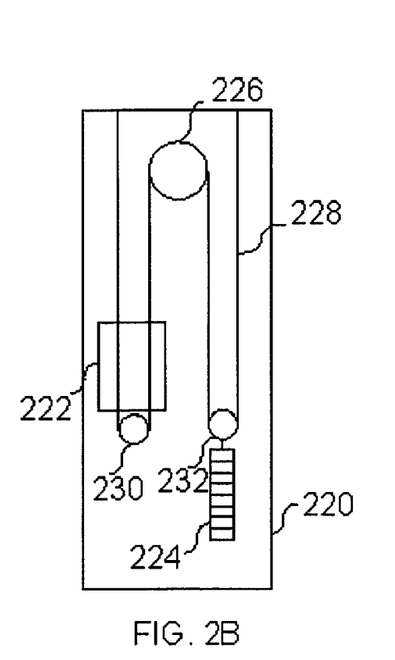
FIG. 2B illustrates elevator roping arrangements having 2:1 roping ratio in one embodiment of the invention.

FIG. 2B illustrates elevator roping arrangements having 2:1 roping ratio in one embodiment of the invention.

In FIG. 2B there is an elevator 220. Elevator 220 has elevator car 222, counterweight 224, traction sheave 226 and traction means 228. The traction means may be elevator ropes or a traction belt. The elevator drive configuration method explained in association with FIG. 1 may be used in elevator 220. In Figure the roping ratio of 2:1 is achieved by looping traction means under a diverting pulley 230 secured to elevator car 222 and under a diverting pulley 232 secured to counterweight 224. The diverting pulleys together with traction means 228 cause that per a revolution of traction sheave 226 elevator car 222 and counterweight 224 are moved a height half of a circumference of traction sheave 226.

Figure 2C:
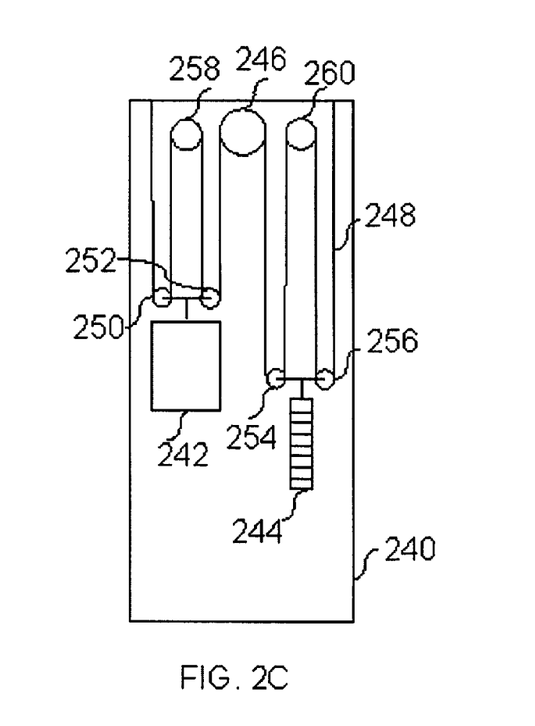
FIG. 2C illustrates elevator roping arrangements having 4:1 roping ratio in one embodiment of the invention.

FIG. 2C illustrates elevator roping arrangements having 4:1 roping ratio in one embodiment of the invention.

In FIG. 2C there is an elevator 240. Elevator 240 has elevator car 242, counterweight 244, traction sheave 246 and traction means 248. The elevator drive configuration method explained in association with FIG. 1 may be used in elevator 240. In FIG. 2C the roping ratio 4:1 is achieved with diverting pulleys 250 and 252 secured to elevator car and diverting pulleys 254 and 256 secured to counterweight. In relation to FIG. 2B the difference is that there are two diverting pulleys for elevator car 242 and counterweight 244 and that there are diverting pulleys 258 and 260 mounted to an upper portion of elevator shaft 240. Traction means 228 are looped over diverting pulleys 258 and 260 in the path between the two respective diverting pulleys of elevator car 242 and counterweight 244. The diverting pulleys together with traction means 228 cause that per a revolution of traction sheave 226 elevator car 222 and counterweight 224 travel a height of a quarter of a circumference of traction sheave 246.

Figure 3:
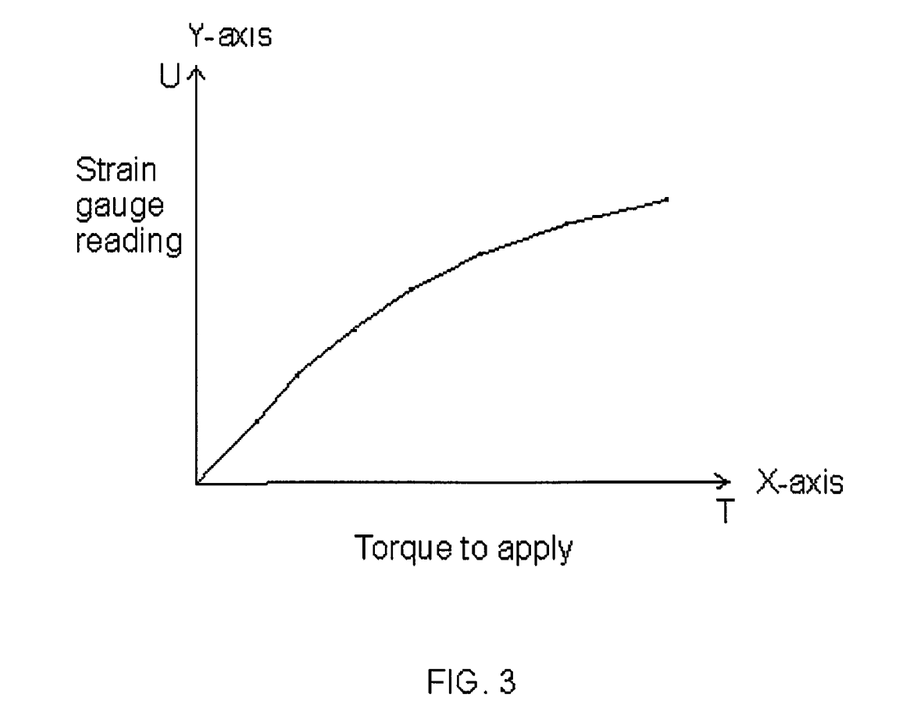
FIG. 3 illustrates a graph illustrating torque to be applied for different strain gauge reading in order to lift an elevator car with a starting acceleration in one embodiment of the invention.

FIG. 3 illustrates a graph illustrating torque to be applied for different load weighing device strain gauge readings in order to lift an elevator car with a starting acceleration in one embodiment of the invention. The Y-axis illustrates different strain gauge readings. The X-axis illustrates torque to apply. The graph illustrates a relationship between strain gauge readings measured using a load weighing device such as load weighing device is FIG. 1 and torques to be applied, using an electrical motor such as electrical motor 112 in FIG. 1, to achieve a starting acceleration which is smooth enough. The information of the graph may be encoded to data structure 154 in FIG. 1.

Figure 4:
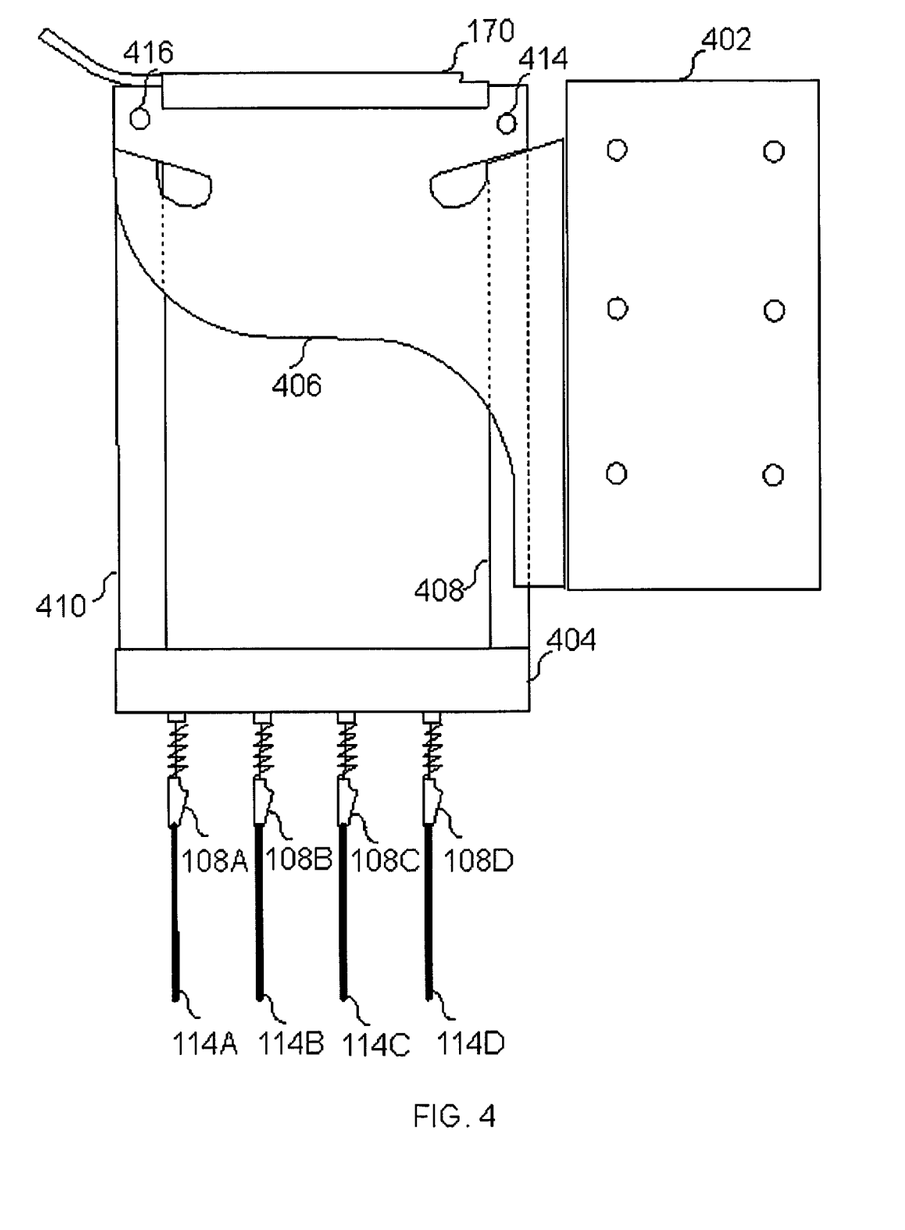
FIG. 4 illustrates an arrangement for anchoring elevator traction ropes, which comprises a strain gauge acting as a load weighing device, in one embodiment of the invention.

FIG. 4 illustrates an arrangement for anchoring elevator traction ropes, which comprises a strain gauge acting as a load weighing device, in one embodiment of the invention. In FIG. 4 there is illustrated a mounting device 400 for a plurality of traction ropes such as traction ropes 114A, 114B, 114C and 114D. Mounting device 400 comprises a mounting plate 402 which may be mounted to a wall or any supporting structure in elevator shaft 102. Mounting device 400 has an intermediate plate 406 which has an upper horizontal surface over which strain gauge 170 is affixed. To intermediate plate 406 is fixed two supporting bars 408 and 410 using respective bolts 414 and 416. Supporting bars 408 and 410 support a horizontal anchoring bar 404 secured to supporting bars 408 and 410 from both sides of anchoring bar 404. To vertical anchoring bar 404 is secure a plurality of elevator shackles such as shackles 108A, 108B, 108C and 108D or a plurality of traction ropes directly. Intermediate plate 406 strains depending on the weight of elevator car which is induced to intermediate plate 406 via the plurality of traction ropes 114A-114D, anchoring bar 404 and supporting bars 408 and 410. Strain in intermediate plate 406 is sensed by strain gauge 170. Strain gauge 170 outputs a voltage that is proportional to strain experienced by intermediate plate 406 and, thus, proportional to weight of elevator car 104.

Figure 5:
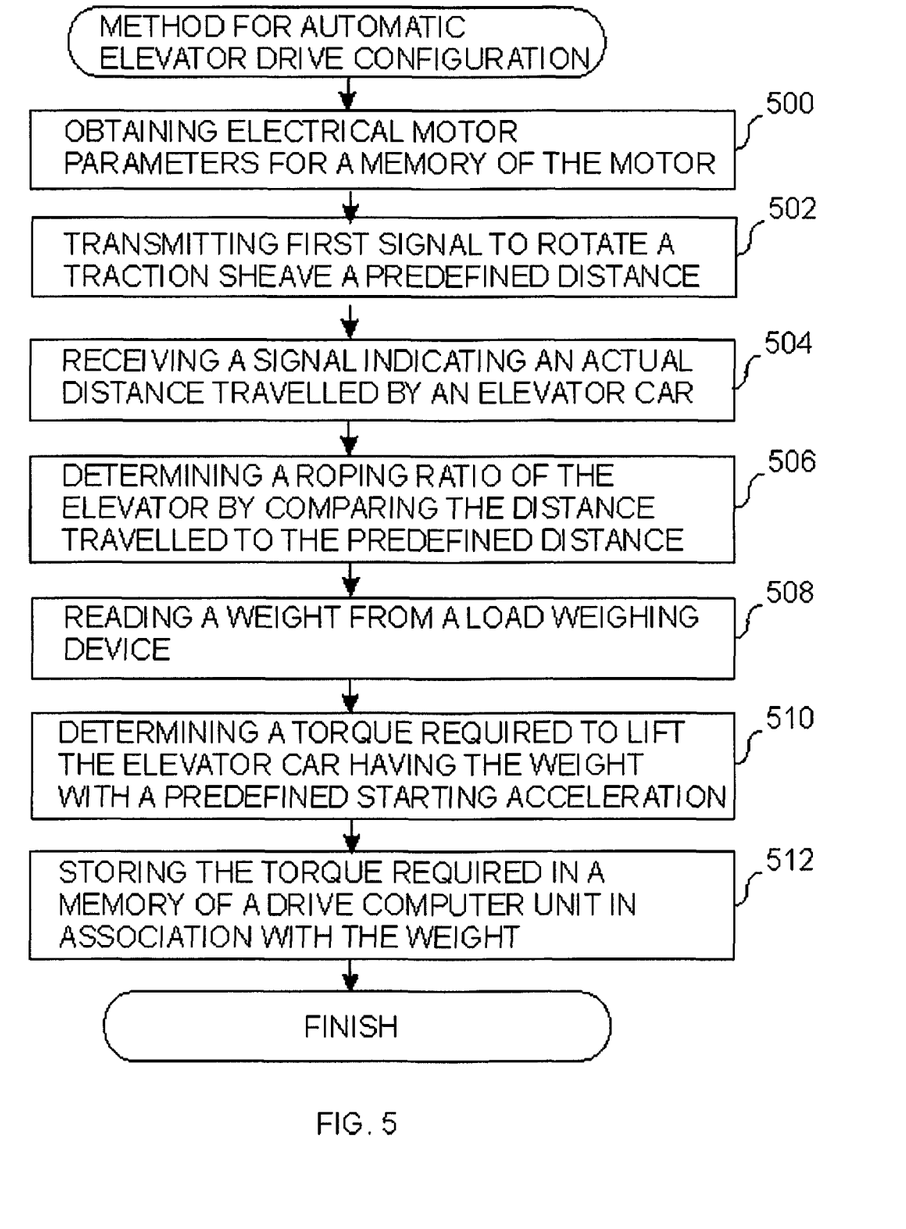
FIG. 5 is a flow chart illustrating a method for automatic elevator drive configuration in one embodiment of the invention.

FIG. 5 is a flow chart illustrating a method for automatic elevator drive configuration in one embodiment of the invention.

At step 500 a drive computer unit, that is, a drive control unit, obtains a plurality of electrical motor parameters via a communication channel from a memory associated with the electrical motor.

At step 502 the drive computer unit transmits a first signal causing the electrical motor to rotate a traction sheave of the elevator a predefined distance, following the obtaining of the plurality of the electrical motor parameters. The first signal may be received by an electrical converter or a rectifier and inverter pair which controls the electrical motor through pulse-width modulated output electrical current. The distance rotated may be verified from an output signal from an encoder in association with the electrical motor.

At step 504 the drive computer unit receives a first measurement signal indicating a distance travelled by a car of the elevator in response to the rotating of the electrical motor the predefined distance. The first response signal is received from at least one of an accelerometer of the elevator car and a position sensor of the elevator car.

At step 506 the drive computer unit determines a roping ratio of the elevator by comparing the distance travelled to the predefined distance.

At step 508 the drive computer unit reads a weight reading from a load weighing device communicatively connected to the drive computer unit.

At step 510 the drive computer unit determines a torque value required to be applied by the electrical motor in order to lift the elevator car with a predefined starting acceleration or starting speed that corresponds to a smooth starting acceleration or speed when the elevator car has a weight corresponding to the weight reading. The determination may comprise trying a plurality of torque values in increasing order starting from an initial torque value computed based on a radius of the traction sheave and at least one parameter among the plurality of electrical motor parameters such as a nominal torque, a nominal current, an acceleration current, an input frequency, a nominal input frequency, a nominal angular velocity, a torque graph, a number of magnetic dipoles, an encoder type, a number of pulses of the encoder and a gear ratio of the electrical motor. The determination may be performed by drive control unit based on a plurality of second measurement signals received from an accelerometer of the elevator car or a position sensor of the elevator car which indicate actual acceleration of elevator car.

The step of reading the weight reading from the load weighing device and the step of determining a torque value required to be applied may be repeated by the drive computer unit for a plurality of test weights.

At step 512 the drive computer unit records to a memory of the drive computer unit the weight reading and the torque value to a data structure used in mapping weight readings to torque values required to lift the elevator car with a predefined acceleration to achieve a smooth starting acceleration or starting peed.

Thereupon, the method is finished. The method steps may be performed in the order of the numbering of the steps.

Figure 6:
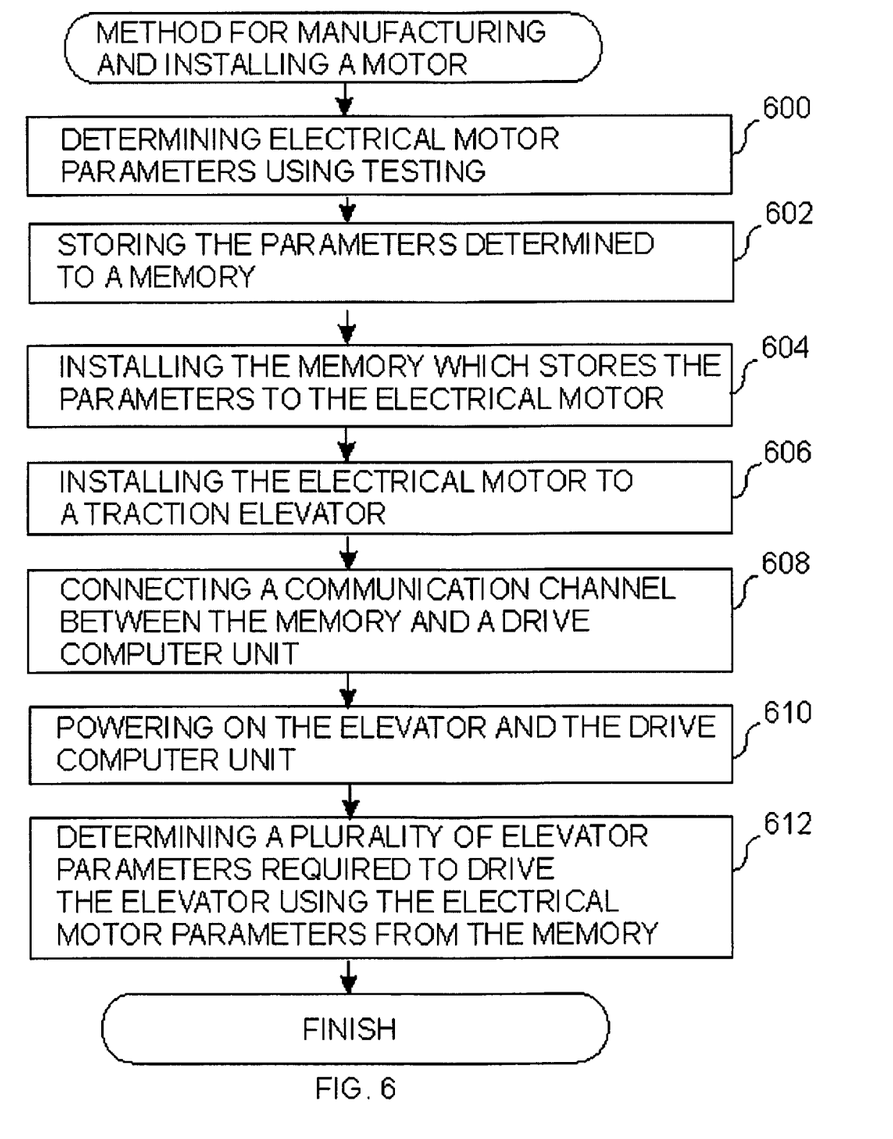
FIG. 6 is a flow chart illustrating a method for manufacturing and installing an electrical motor in a traction elevator in one embodiment of the invention.

FIG. 6 is a flow chart illustrating a method for manufacturing and installing an electrical motor in a traction elevator in one embodiment of the invention.

At step 600 a plurality of parameters of an electrical motor are determining during a testing of the electrical motor. The plurality of parameters may comprising at least one of a serial number, a nominal torque, a nominal current, a resistance, a reactance, a source voltage, a voltage, an acceleration current, an input frequency, a nominal input frequency, a nominal angular velocity, a torque graph, a traction sheave diameter, a traction sheave radius, a number of magnetic dipoles, a brake voltage, a brake current, a brake current decay time, a brake current half-life, an encoder type, a number of pulses of the encoder and a gear ratio of the electrical motor.

At step 602 the plurality of parameters of the electrical motor are stored to a memory.

At step 604 the memory is installed to the electrical motor.

At step 606 the electrical motor is installed in to the traction elevator, following the installing of the memory to the electrical motor.

At step 608 a communication channel between a drive computer unit and a memory comprising a plurality of electrical motor parameters is connected.

At step 610 the elevator and the drive computer unit are powered on.

At step 612 a plurality of elevator parameters required in driving the elevator correctly are determined by the drive computer unit. The plurality of elevator parameters is determined using the plurality of parameters of an electrical motor.

Thereupon, the method is finished. The method steps may be performed in the order of the numbering of the steps.

The embodiments of the invention described hereinbefore in association with FIGS. 1, 2A, 2B, 2C, 3, 4 and 5 or the summary of the invention may be used in any combination with each other. Several of the embodiments may be combined together to form a further embodiment of the invention.

The exemplary embodiments of the invention can be included within any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (for instance, voice, modem, and the like), wireless communications media, one or more wireless communications networks, cellular communications networks, 3G communications networks, 4G communications networks, Long-Term Evolution (LTE) networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices, or one or more software entities such as modules.

The exemplary embodiments can store information relating to various processes described herein. This information can be stored in one or more memories, such as a hard disk, optical disk, magneto-optical disk, RAM, and the like. One or more databases can store the information regarding cyclic prefixes used and the delay spreads measured. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of one or more application-specific integrated circuits or by interconnecting an appropriate network of conventional component circuits, as will be appreciated by those skilled in the electrical art(s).

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

The embodiments of the invention described hereinbefore in association with the figures presented and the summary of the invention may be used in any combination with each other. At least two of the embodiments may be combined together to form a further embodiment of the invention.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method for automatically configuring an elevator drive of a traction elevator by an drive computer, the traction elevator including an elevator car, a counterweight, a traction sheave, an electrical motor and a plurality of elevator ropes, the plurality of elevator ropes configured to hoist the elevator car in response to the electrical motor rotating the traction sheave, the method comprising:

obtaining, by the drive computer, a plurality of electrical motor parameters via a communication channel from a memory associated with the electrical motor;

transmitting, by the drive computer, a first signal to the electrical motor based on the plurality of electrical motor parameters, the first signal causing the electrical motor to rotate the traction sheave a rotational amount;

receiving, by the drive computer, a first measurement signal from at least one of an accelerometer of the elevator car and a position sensor of the elevator car, the first measuring signal indicating a distance travelled by the elevator car in response to the electrical motor rotating the traction sheave the rotational amount; and determining, by the drive computer, a roping ratio of the traction elevator based on the distance travelled by the elevator car and the rotational amount of the traction sheave.

2. The method according to claim 1, the method comprising:

reading, by the drive computer, a plurality of weights from a load weighing device during respective ones of a plurality of tests performed after the determining determines the roping ratio, the elevator car being loaded during the plurality of tests with a respective one of a plurality of test weights, each of the plurality of test weights being different, each of the plurality of weights including at least one of a weight of the elevator car and a weight of a load in the elevator car;

determining, by the drive computer, a first plurality of torque value based on a plurality of second measurement signals, each of the first plurality of torque values corresponding to a respective one of the plurality of weights the first plurality of torque values being applied by the electrical motor to lift the elevator car, the plurality of second measurement signals being received from a rotor movement sensor, the rotor movement sensor including at least one of a rotor encoder, the accelerometer of the elevator car and the position sensor of the elevator car, the plurality of second measurement signals indicating starting sway of the elevator car; and recording to a memory of the drive computer, the first plurality of torque values such that the first plurality of torque values are associated in the memory with respective ones of the plurality of weights.

3. The method according to claim 1, the method further comprising:

determining, by the drive computer, a rotation direction of the electrical motor based on the distance travelled by the elevator car and the rotational amount of the traction sheave.

4. The method according to claim 2, wherein the determining the first plurality of torque values comprises:

estimating, by the drive computer, a plurality of estimated torques corresponding to respective ones of the plurality of weights;

initiating, by the drive computer, the electrical motor to apply the plurality of estimated torques during respective ones of the plurality of tests;

determining, by the drive computer, a plurality of differences starting accelerations during the plurality of tests based on a plurality of third measurement signals, the plurality of second measurement signals including the plurality of third measurement signals;

initiating, by the drive computer, the electrical motor to apply a plurality of adjusted torques during respective ones of the plurality of tests, the plurality of adjusted torques being based on the plurality of differences in starting accelerations; and repeating the determining the plurality of differences and the initiating the applying the plurality of adjusted torques until the plurality of differences are below a threshold value.

5. The method according to claim 2, the method further comprising:

transmitting, by the drive computer, a second signal to the electrical motor, the second signal causing the electrical motor to lift or lower the elevator car to a test floor;

reading, by the drive computer, a plurality of weights of the elevator car during respective ones of a plurality of tests from a load weighing device communicatively connected to the drive computer, the elevator car being loaded during the plurality of tests with respective ones of a plurality of test weights, each of the plurality of test weights being different, the elevator car being at the test floor during the plurality of tests;

determining, by the drive computer, a second plurality of torque values based on a plurality of second measurement signals received from at least one of the accelerometer of the elevator car and the position sensor of the elevator car, the second plurality of torque values corresponding to respective ones of the plurality of weights read while the elevator car is at the test floor, the second plurality of respective torque values being applied by the electrical motor to lift the elevator car with a set starting acceleration; and recording to the memory of the drive computer associations between an identifier of the test floor and the second plurality of torque values determined for the respective ones of the plurality of weights.

6. The method according to claim 4, the method further comprising:

determining an elapsing of a time associated with the recording to the memory of the drive computer;

reading, by the drive computer, a weight of the elevator car from a load weighing device;

determining, by the drive computer, a torque value for the weight of the elevator car based on at least one fourth measurement signal received from at least one of the accelerometer of the elevator car and the position sensor of the elevator car, the torque value being applied by the electrical motor in order to lift the elevator car with a set starting acceleration; and recording to a memory of the drive computer, the torque value determined for the weight, the torque value being associated in the memory with the weight.

7. The method according to claim 5, wherein the elevator car is loaded with a plurality of passengers.

8. The method according to claim 1, wherein the obtaining obtains the plurality of electrical motor parameters via a rotor encoder of the electrical motor.

9. The method according to claim 8, further comprising:

obtaining at least one rotor position signal from the rotor encoder of the electrical motor via a communication channel.

10. The method according to claim 1, wherein the memory is connected to the drive computer via thermistor leads of the electrical motor.

11. The method according to claim 9, the method further comprising:

cutting a power supply to the electrical motor via an electrical motor overload relay, if the plurality of electrical motor parameters indicate that an overload has occurred.

12. The method according to claim 9, the method further comprising:

measuring a resistance of at least one coil in the electrical motor, the resistance being one of the plurality of electrical motor parameters; and cutting a power supply to the electrical motor, if the resistance exceeds a threshold value.

13. The method according to claim 1, wherein the plurality of electrical motor parameters obtained from the memory associated with the electrical motor include an error detecting code to allow the drive computer to check a correctness of the plurality of electrical motor parameters.

14. The method according to claim 2, wherein the load weighing device is a strain gauge on a surface of a mounting device to which the plurality of elevator ropes are secured, the load weighing device measuring a strain on the surface proportional to a load of the elevator car.

15. The method according to claim 1, the method further comprising:
reading, by the drive computer, a load weight from a load weighing device when the traction elevator is in use;
interpolating a torque value corresponding to the load weight based on at least two weights retrieved from a memory of the drive computer, the torque value causing a set starting acceleration; and
applying the torque value to lift the elevator car.

16. An apparatus comprising:
a processor of a drive computer configured to control the drive computer to,
obtain a plurality of electrical motor parameters via a communication channel from a memory associated with an electrical motor,
transmit a first signal causing the electrical motor to rotate a traction sheave of an elevator a rotational amount, after obtaining of the plurality of the electrical motor parameters, the traction sheave configured to hoist an elevator car via a plurality of traction ropes in response to the electrical motor rotating the traction sheave,
receive a first measurement signal from at least one of an accelerometer of an elevator car and a position sensor of the elevator car, the first measurement signal indicating a distance travelled by the elevator car in response to the traction sheave rotating the rotational amount,
determine a roping ratio of the elevator based on the distance travelled by the elevator car and the rotational amount,
read a plurality of elevator car weights of the elevator car from a load weighing device during a plurality of tests after the processor determines the roping ratio, the elevator car being loaded during the plurality of tests with respective ones of a plurality of test weights, each of the plurality of test weights being different,
determine a plurality of torque values for respective ones of the plurality of test weights based on respective ones of a plurality of second measurement signals received from at least one of an accelerometer of the elevator car and a position sensor of the elevator car, the plurality of torque values being applied by the electrical motor to lift the elevator car with a set starting acceleration, and
record to a memory of the drive computer, the plurality of torque values such that the plurality of torque values are associated in the memory of the drive computer with the respective ones of the plurality of elevator car weights.

17. A non-transitory computer readable medium containing computer readable instructions that, when executed by a processor of a drive computer, cause the processor to control the drive computer to:
obtain a plurality of electrical motor parameters via a communication channel from a memory associated with an electrical motor;
transmit a first signal causing the electrical motor to rotate a traction sheave of an elevator a rotational amount after the processor obtains the plurality of the electrical motor parameters;
receive from at least one of an accelerometer of an elevator car and a position sensor of the elevator car a first measurement signal indicating a distance travelled by the elevator car in response to the traction sheave rotating the rotational amount
determine a roping ratio of the elevator based on the distance travelled by the elevator car and the rotational amount;
read a plurality of elevator car weights of the elevator car from a load weighing device during a plurality of tests after the processor determines the roping ratio, the elevator car being loaded during the plurality of tests with respective ones of a plurality of test weights, each of the plurality of test weights being different;
determine a plurality of torque values for respective ones of the plurality of test weights based on respective ones of a plurality of second measurement signals received from at least one of the accelerometer of the elevator car and the position sensor of the elevator car, the plurality of torque values being applied by the electrical motor to lift the elevator car with a set starting acceleration; and
record to a memory associated with of the drive computer, the plurality of torque values such that the plurality of torque values are associated in the memory with the respective ones of the plurality of elevator car weights.

18. The method according to claim 1, wherein the first signal causes the electrical motor to rotate the traction sheave the rotational amount by causing a converter to output a power signal.

19. The apparatus according to claim 16, wherein the first signal causes the electrical motor to rotate the traction sheave the rotational amount by causing a converter to output a power signal.

20. The non-transitory computer readable medium according to claim 17, wherein the first signal causes the electrical motor to rotate the traction sheave the rotational amount by causing a converter to output a power signal.

* * * * *